US012776692B2

(12) United States Patent
Simonin et al.

(10) Patent No.: US 12,776,692 B2
(45) Date of Patent: Oct. 27, 2026

(54) GROUNDING BRUSH ASSEMBLY

(71) Applicant: AKTIEBOLAGET SKF, Gothenburg (SE)

(72) Inventors: Anthony Simonin, Tours (FR); Emmanuel Benevise, Monts (FR); Thomas Perrotin, Saint Roch (FR); Bruno Constant, Tours (FR); Benoit Arnault, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 147 days.

(21) Appl. No.: 18/809,494

(22) Filed: Aug. 20, 2024

(65) Prior Publication Data

US 2025/0079950 A1 Mar. 6, 2025

(30) Foreign Application Priority Data

Aug. 30, 2023 (FR) .................................. FR2309089

(51) Int. Cl.
*H02K 11/40* (2016.01)
*H02K 13/10* (2006.01)

(52) U.S. Cl.
CPC ............. *H02K 11/40* (2016.01); *H02K 13/10* (2013.01)

(58) Field of Classification Search
CPC ............................... H02K 11/40; H02K 13/10
See application file for complete search history.

(56) References Cited

U.S. PATENT DOCUMENTS

| | | | | |
|---|---|---|---|---|
| 3,745,393 | A * | 7/1973 | Spors ..................... | H02K 5/148 310/239 |
| 11,486,445 | B2 | 11/2022 | Berruet et al. | |
| 2016/0111941 | A1 | 4/2016 | Sturm et al. | |
| 2017/0108047 | A1 | 4/2017 | White et al. | |
| 2021/0021180 | A1 | 1/2021 | Hubert et al. | |
| 2021/0310517 | A1 | 10/2021 | Berruet et al. | |
| 2021/0364040 | A1 * | 11/2021 | Arnault ................. | F16C 41/002 |
| 2022/0294319 | A1 | 9/2022 | Arnault et al. | |
| 2023/0261555 | A1 | 8/2023 | Arnault et al. | |

FOREIGN PATENT DOCUMENTS

| | | | |
|---|---|---|---|
| CN | 116598858 | A | 8/2023 |
| DE | 102019207241 | A1 | 11/2020 |
| DE | 102021114965 | A1 | 12/2022 |
| FR | 3110650 | A1 | 11/2021 |
| FR | 3120754 | A1 | 9/2022 |
| FR | 3132806 | A1 | 8/2023 |
| KR | 102444892 | B1 | 9/2022 |

OTHER PUBLICATIONS

Unpublished U.S. Appl. No. 18/809,517, first named inventor: Anthony Simonin, filing date: Aug. 20, 2024.

Unpublished U.S. Appl. No. 18/809,487, first named inventor: Anthony Simonin, filing date: Aug. 20, 2024.

* cited by examiner

*Primary Examiner* — Sean Gugger

(74) *Attorney, Agent, or Firm* — J-TEK LAW PLLC; Scott T. Wakeman; Mark A. Ussai

(57) ABSTRACT

A grounding brush assembly includes a grounding brush provided with a plurality of conductive fibers and with a support inside of which the conductive fibers are mounted, and a brush mounting plate which is secured to the support of the brush. The assembly further includes a spacer washer supported by the mounting plate and arranged axially on the side opposite the brush in relation to the mounting plate.

10 Claims, 6 Drawing Sheets

GROUNDING BRUSH ASSEMBLY

CROSS-REFERENCE

This application claims priority to French patent application no. 2309089 filed on Aug. 30, 2023, the contents of which are fully incorporated herein by reference.

BACKGROUND OF THE INVENTION

The present invention relates to the field of grounding devices for controlling the shaft current generated in electric motors or machines, and in particular grounding brush assemblies.

In an electric motor or machine, at least one rolling bearing is mounted between the housing of the electric motor or machine and the rotary shaft so as to support this shaft.

In operation, as the shaft rotates, an electrical potential difference can appear between the shaft and the housing of the electric motor or machine, which produces an electric current between the inner race of the rolling bearing, which is secured to the shaft, and the outer race secured to the housing.

The electric current passing through the components of the rolling bearing can damage these components, in particular the rolling elements and the raceways formed on the inner and outer races. Electrical discharges can also generate vibrations.

In order to remedy these drawbacks, it is known practice to earth or ground the rotary shaft by using a grounding brush comprising conductive fibers. The grounding brush is generally mounted in the bore of the housing of the electric motor in such a way that the free ends of the fibers are in radial contact with the outer surface of the rotary shaft.

By virtue of the conductivity of the fibers, the brush is kept at the same electrical potential as the housing of the electric motor. The inner and outer races of the rolling bearing are also at the same electrical potential, which reduces or even eliminates problematic electrical discharges through the rolling bearing.

For further detail regarding the design of such a grounding brush assembly, reference may be made, for example, to US Patent Publication No. 2021/0021180 A1, which describes an assembly comprising a grounding brush provided with a plurality of conductive fibers, a support inside which the conductive fibers are mounted, and an annular mounting plate comprising a plurality of tongues for the radial and axial retention of the support.

Depending on the relative axial positions of the grounding brush assembly and the bearing, there may be contact, during the operation of the electric machine, between the conductive fibers of the assembly on the one hand, and the rolling elements and/or the inner race of the bearing on the other hand. Such contact may damage the bearing.

SUMMARY OF THE INVENTION

The present invention aims to remedy the drawback discussed above and relates to a grounding brush assembly comprising a grounding brush provided with a plurality of conductive fibers and with a support inside which the conductive fibers are mounted. The assembly also comprises a brush mounting plate which is secured to the support of the brush.

According to a general feature, the assembly further comprises a spacer washer supported by the mounting plate and arranged axially on the side opposite to the brush in relation to the mounting plate.

With this design, the risk of contact between the conductive fibers of the assembly and the bearing is limited. To be specific, the spacer washer makes it possible to establish and keep an axial space between the mounting plate of the grounding brush assembly and the bearing or the housing.

Advantageously, the spacer washer protrudes axially with respect to the mounting plate. The risk of contact between the conductive fibers of the assembly and the bearing is thus further limited.

Preferably, the spacer washer is made from a material which is electrically insulating, in other words electrically non-conductive. This makes it possible to prevent the dissipation of electrical charge to the bearing in the event of contact between the washer and the bearing.

According to a particular design, the spacer washer is annular, i.e., a solid ring. Alternatively, the spacer washer may be open at a point about its circumference.

The mounting plate may comprise a radial portion against which are mounted, pressing axially on each side, the brush and the spacer washer.

The mounting plate may include at least one mounting portion extending at least axially from the radial portion of the mounting plate and on which is mounted the spacer washer. The mounting portion may extend from a small-diameter edge of the radial portion of the mounting plate.

In one particular embodiment, the mounting plate comprises a plurality of retention tongues extending from the radial portion and configured to retain the support of the brush.

In one embodiment, the mounting plate includes at least one centering portion or centering tab extending at least axially from the radial portion, which is offset radially outwardly with respect to the support and has an outer surface defining the outside diameter of the mounting plate.

The mounting plate may be made as a single piece.

Preferably, the spacer washer is flush with or is radially set back from the outer surface of the centering portion. This makes it possible to facilitate the mounting of the assembly inside the associated housing.

The invention further relates to an electric motor comprising a housing, a shaft and at least one grounding brush assembly as defined hereinabove and mounted radially between the housing and the shaft, the conductive fibers of the brush of the assembly being in contact with the shaft.

BRIEF DESCRIPTION OF THE SEVERAL VIEWS OF THE DRAWINGS

The present invention will be better understood on studying the detailed description of an embodiment, given by way of non-limiting example and illustrated by the appended drawings, in which.

DETAILED DESCRIPTION OF THE INVENTION

Figure 1:
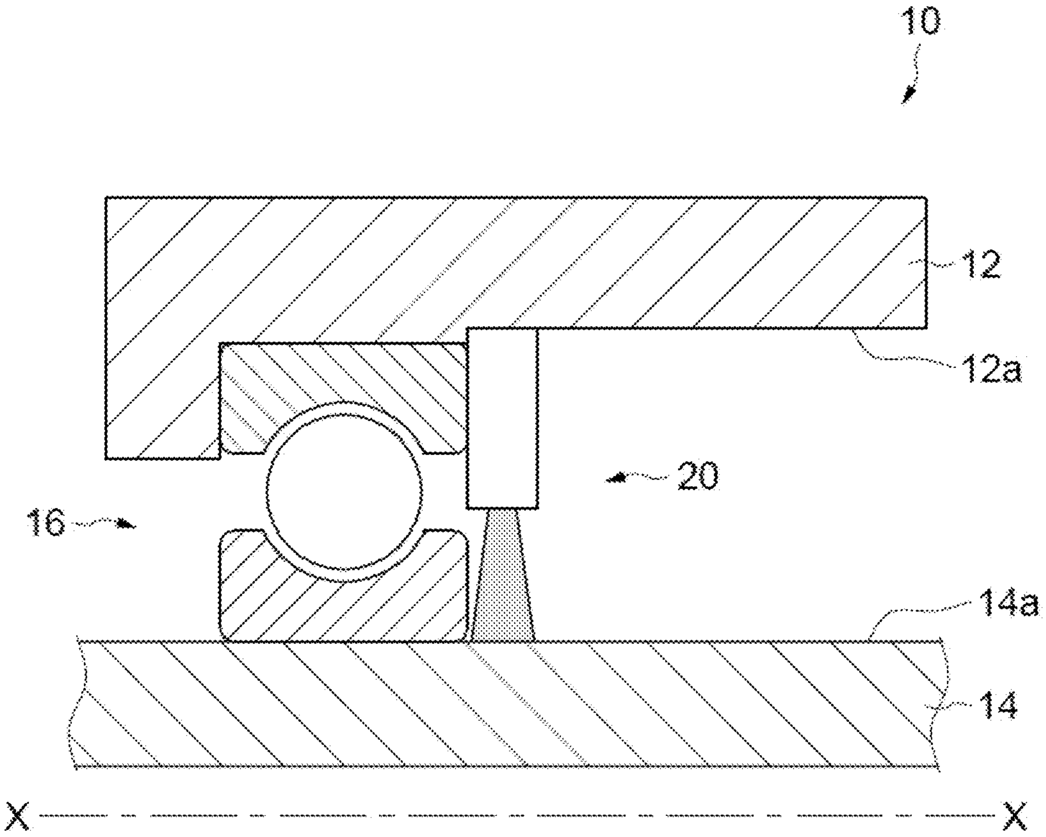
FIG. 1 is a view in axial section of a grounding brush assembly mounted radially between a rotary shaft and a housing of an electric motor.

FIG. 1 shows, in axial section, part of an electric motor 10 or machine comprising a fixed housing 12, a rotary shaft 14, of axis X-X, which is supported radially by a rolling bearing 16. The bearing 16 is mounted radially between the housing 12 and the rotary shaft 14. In this instance, the bearing 16 is of the ball bearing type. Alternatively, the bearing 16 may include other types of rolling elements, such as cylindrical rollers or tapered rollers, or may even be formed as a plain journal bearing.

The motor 10 further comprises a grounding brush assembly 20 which is mounted radially between the bore 12*a* of the housing 12 and the outer cylindrical surface 14*a* of the rotary shaft 14. The grounding brush assembly 20 functions to continuously dissipate any electrical charge that builds up on the shaft 14 of the motor 10 when the motor 10 is in operation, by transferring this charge to the housing 12.

A grounding brush assembly 20 according to an exemplary embodiment of the invention will now be described with reference to FIGS. 2-6. The grounding brush assembly 20 has an annular overall shape. The assembly 20 comprises a grounding brush 30 and a brush mounting plate 40 which is configured to radially center the brush 30.

As will be described in more detail below, the assembly 20 further comprises a spacer washer 50 supported by the mounting plate 40.

The brush 30 includes a plurality of conductive individual fibers 31 which are intended to come around or surround the rotary shaft 14 of the motor 10. The conductive fibers 31 may be made from carbon, stainless steel, conductive plastics, such as fibers made from acrylic or nylon, or any other appropriate conductive material.

The brush 30 further comprises a holding or support member 32, inside which the conductive fibers 31 are mounted or at least partially disposed. In the exemplary embodiment illustrated, the support 32 is in the form of an open ring. The support 32 may be produced by cutting and pressing. The support 32 is made from an electrically conductive material such as aluminum, stainless steel, bronze, copper or another appropriate material. Alternatively, the support 32 may be made from an electrically non-conductive material with a conductive coating or a conductive paint applied to the support 32.

Figure 5:
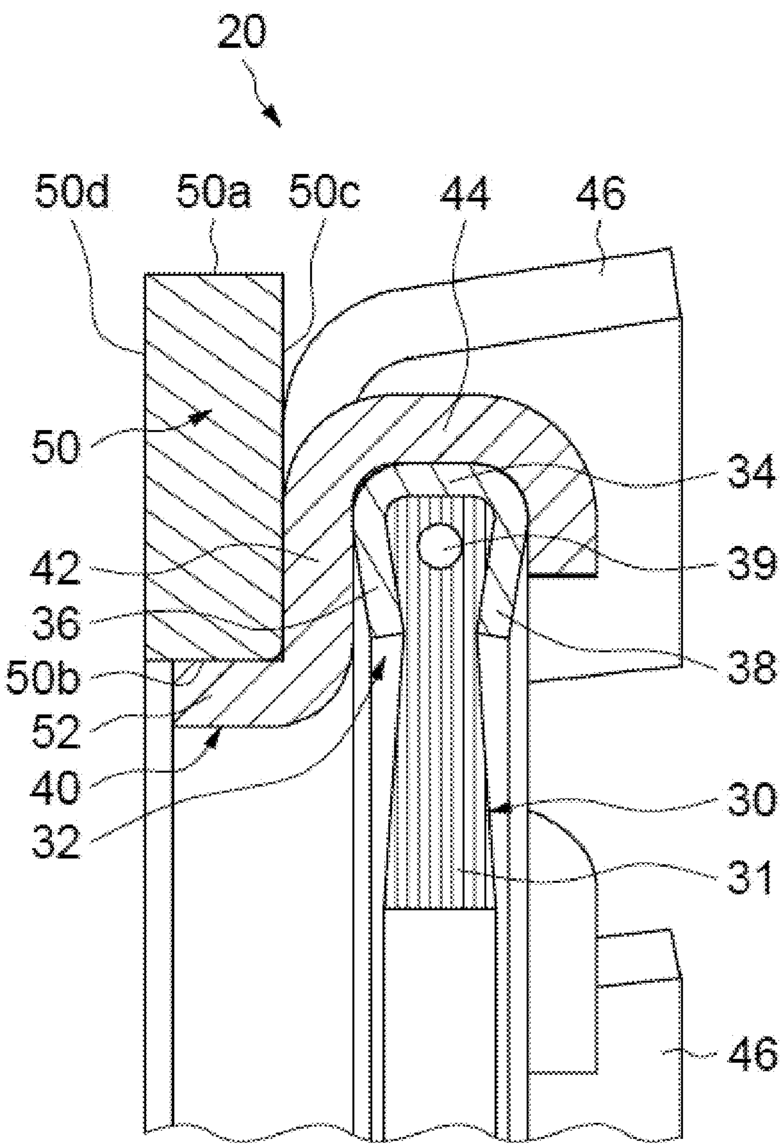
FIG. 5 is a sectional view along line V-V in FIG. 4.
Figure 6:
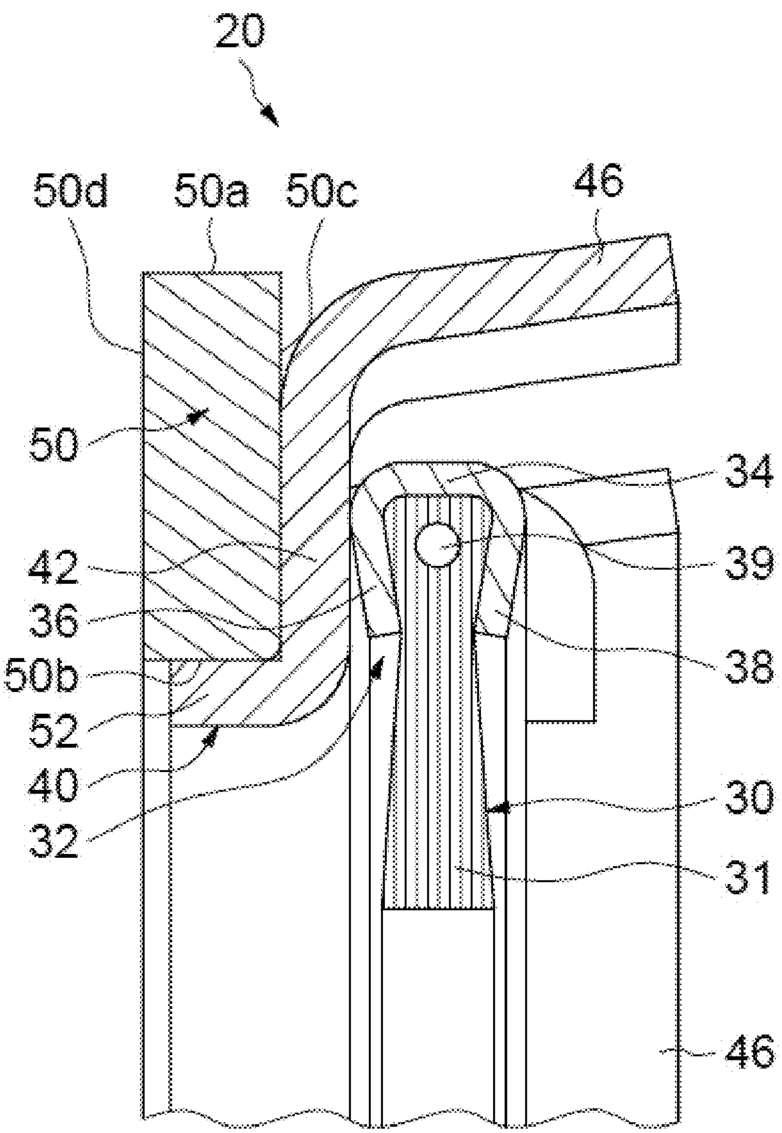
FIG. 6 is a sectional view along line VI-VI in FIG. 4.

As shown more clearly in FIGS. 5 and 6, the support 32 includes an axial mounting portion 34 and two opposite lateral flanks 36, 38 extending inwardly from the mounting portion 34 and axially gripping the conductive fibers 31. The conductive fibers 31 press axially on each side against the lateral flanks 36, 38; specifically, the conductive fibers 31 press axially on each side against the internal faces of the lateral flanks 36, 38.

The mounting portion 34 and the two lateral flanks 36, 38 delimit a channel which is open radially on the inside and inside which the conductive fibers 31 are at least partially positioned or disposed.

In the depicted example, the conductive fibers 31 are bent around a connecting wire 39 of the support 32. The free distal end of each of the conductive fibers 31 is intended to come into radial contact with the outer surface of the rotary shaft 14 of the motor 10. The proximal end of the conductive fibers 31 is in radial contact with the mounting portion 34 of the support 32.

The lateral flank 36 extends from one axial end of the mounting portion 34 and the lateral flank 38 extends from the opposite axial end of the portion 34. The lateral flanks 36, 38 extend obliquely inwardly from the mounting portion 34. The lateral flanks 36, 38 are symmetrical with each other about a radial midplane (not indicated) of the support 32. The mounting portion 34 preferably extends axially, but may alternatively extend obliquely.

Figure 2:
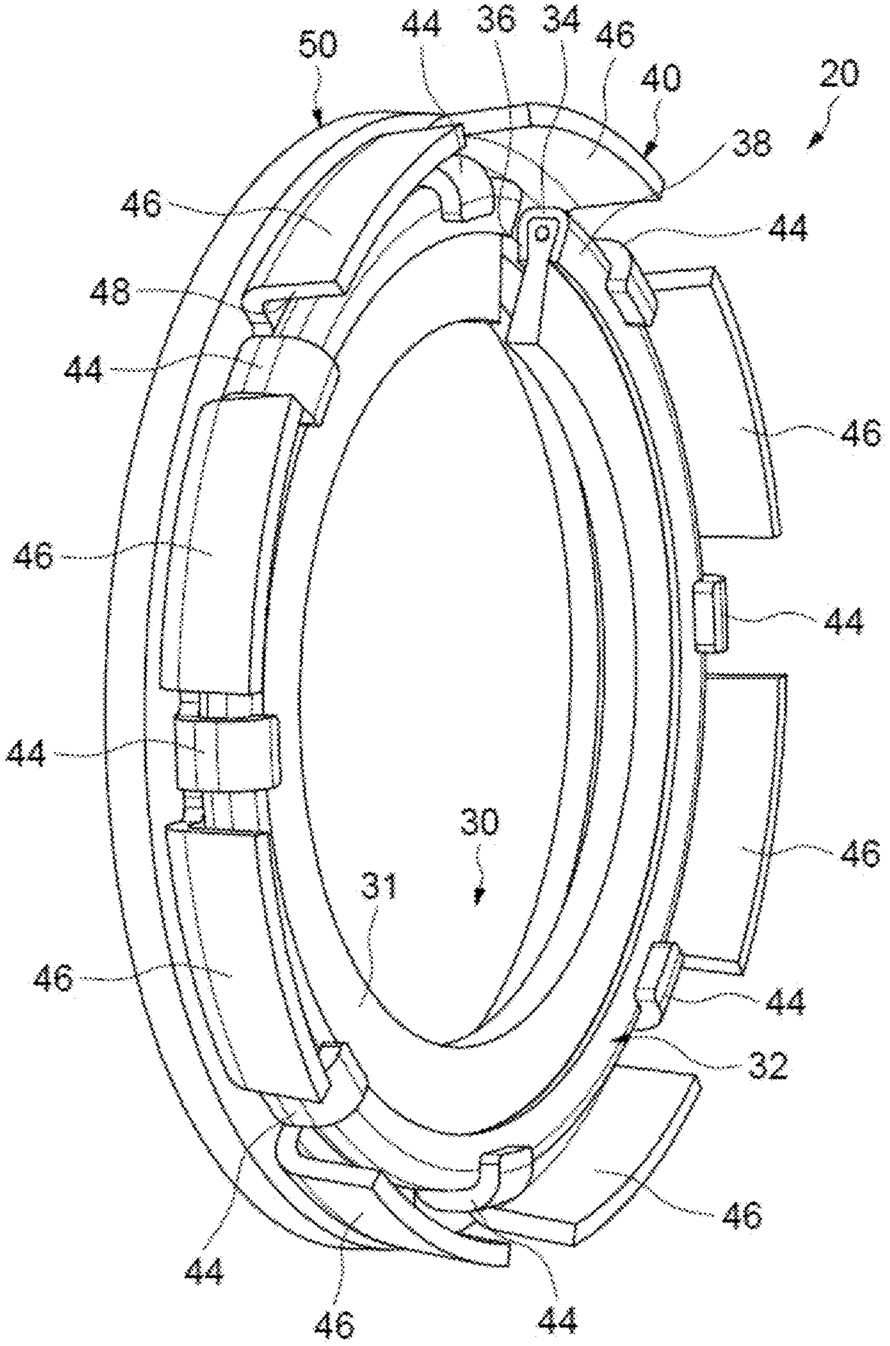
FIG. 2 is a front perspective view of a grounding brush assembly according to an exemplary embodiment.
Figure 3:
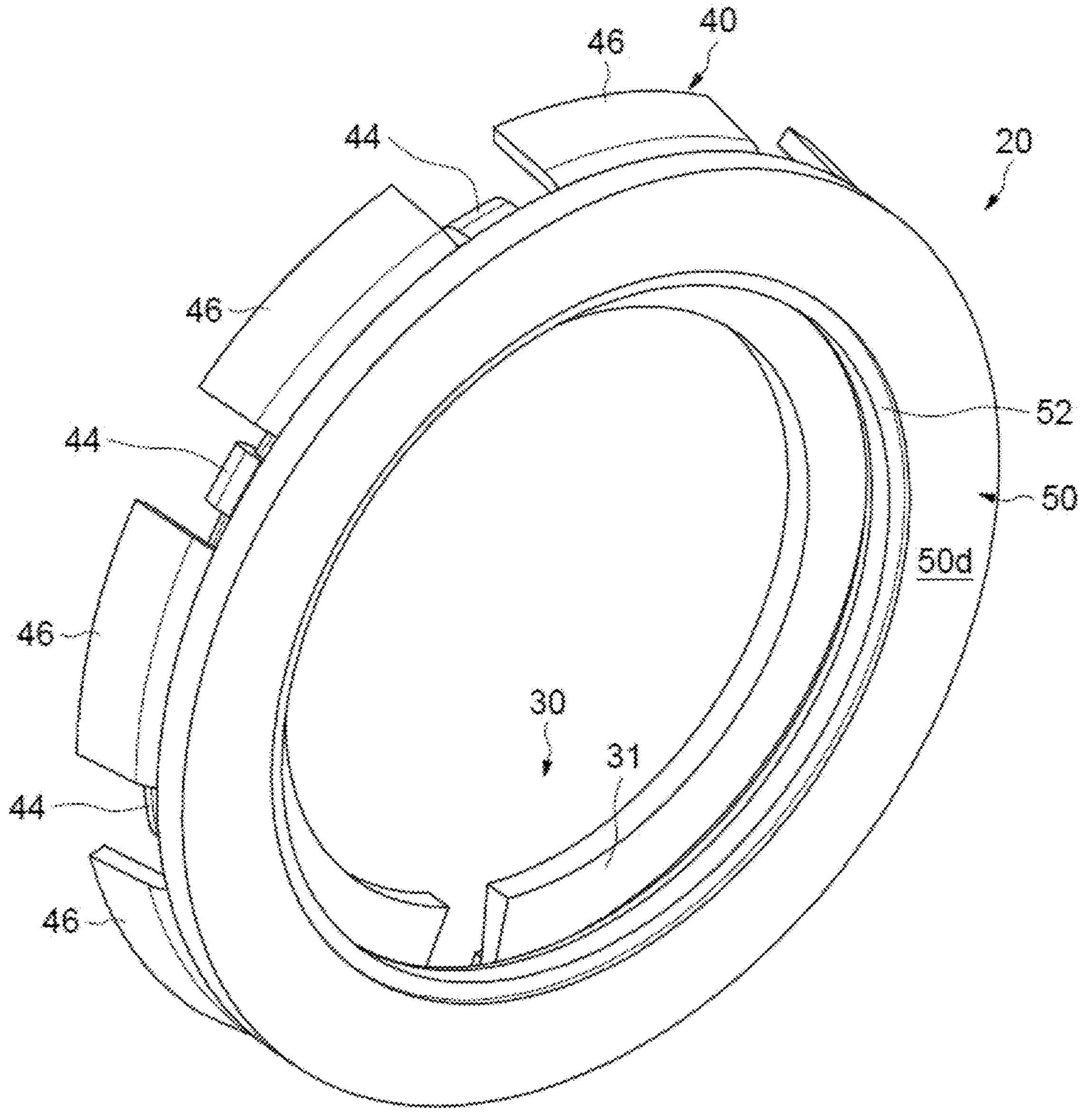
FIG. 3 is a rear perspective view of the grounding brush assembly according to the exemplary embodiment of the invention.

As stated above, the brush 30 is in the form of an open ring, as can be seen in particular in FIGS. 2 and 3. This allows the brush 30 to adapt to suit or fit different diameters of the motor shaft 16. In general, the circumferential ends of the brush 16 are not joined together. Alternatively, the circumferential ends of the brush 30 may be connected together.

With reference to FIGS. 2, 5 and 6, the mounting plate 40 includes an annular radial portion 42, and a plurality of retention tongues 44 extending from the radial portion 42.

The radial portion 42 of the mounting plate 40 bears axially against the support 32 of the brush 30. More specifically, the radial portion 42 bears axially against the lateral flank 36 of the support 32. In other words, the support 32 of the brush 30 is disposed axially against a first axial side of the radial portion 42 of the mounting plate 40.

The retention tongues 44 are spaced apart from each other in the circumferential direction, preferably evenly or regularly spaced apart. Alternatively, the retention tongues 44 may be irregular circumferential spaced or staggered. In the depicted exemplary embodiment, the mounting plate 40 has eight retention tongues 44, but may alternatively be provided with a greater or lesser number of the tongues 44. For example, it is possible to provide two tongues 44 or at least four tongues 44. Preferably, the mounting plate 40 has at least two retention tongues 44.

Each retention tongue 44 protrudes axially with respect to the radial portion 42, specifically from the first axial side of the radial portion 42. Each tongue 44 locally radially surrounds the support 32 of the brush 30 and is in radial contact with the mounting portion 34 of the support 32. The support 32 is held axially bearing against the radial portion 42 of the mounting plate 40 by the tongues 44. The tongues 44 function to axially and radially retain the grounding brush 30. The lateral flank 36 of the support 32 bears against the first side of the radial portion 42 of the mounting plate 40 and the lateral flank 38 bears against the tongues 44. The retention tongues 44 are preferably formed substantially identical to each other.

As shown more clearly in FIG. 5, each retention tongue 44 is provided with an axial portion extending axially from the radial portion 42 of the mounting plate 40, locally radially surrounding the support 32 and in radial contact therewith, and with a bent-over portion at the free end of the axial portion. The bent-over portion 44*b* of each tongue 44 functions to axially retain the support 32 of the grounding brush 30. The bent-over portion 44*b* of each tongue 44 is in axial contact against the lateral flank 38 of the support 32.

The mounting plate 40 of the brush also comprises a plurality of centering tabs 46 extending from the first side of the radial portion 42 and spaced apart from each other in the circumferential direction. A cutout 48 (FIG. 2) is formed on the radial portion 42 of the mounting plate 40 between each pair of immediately successive or adjacent centering tabs 46. The tabs 46 are formed by cutting and bending sections of the radial portion 42 of the mounting plate 40.

Each centering tab 46 extends axially from the radial portion 42. Specifically, the tabs 46 extend obliquely from a large-diameter edge of the radial portion 42 and extend axially from the same side of the radial portion 42 as the retention tongues 44.

Each centering tab 46 locally radially surrounds the support 32 of the brush 30 while remaining separated or spaced therefrom. Specifically, the tabs 46 are partially offset radially outwardly with respect to the tongues 44. The tabs 46 are in this case formed substantially identical to each other and collectively define the outside diameter of the mounting plate 40. Preferably, each tab 46 extends obliquely, but may alternatively extend axially. Each tab 46 is in the form of a portion of a partial cylinder. The bore in each tab 46 is radially spaced apart from the support 32 by a non-zero radial distance. The outer surfaces of the tabs 46 define the outside diameter of the mounting plate 40. The tabs 46 function to center the mounting plate 40 once it has been mounted in the bore 12*a* of the housing 12 of the associated electric motor 10 by engaging with the inner circumferential surface defining the bore 12*a*.

Figure 4:
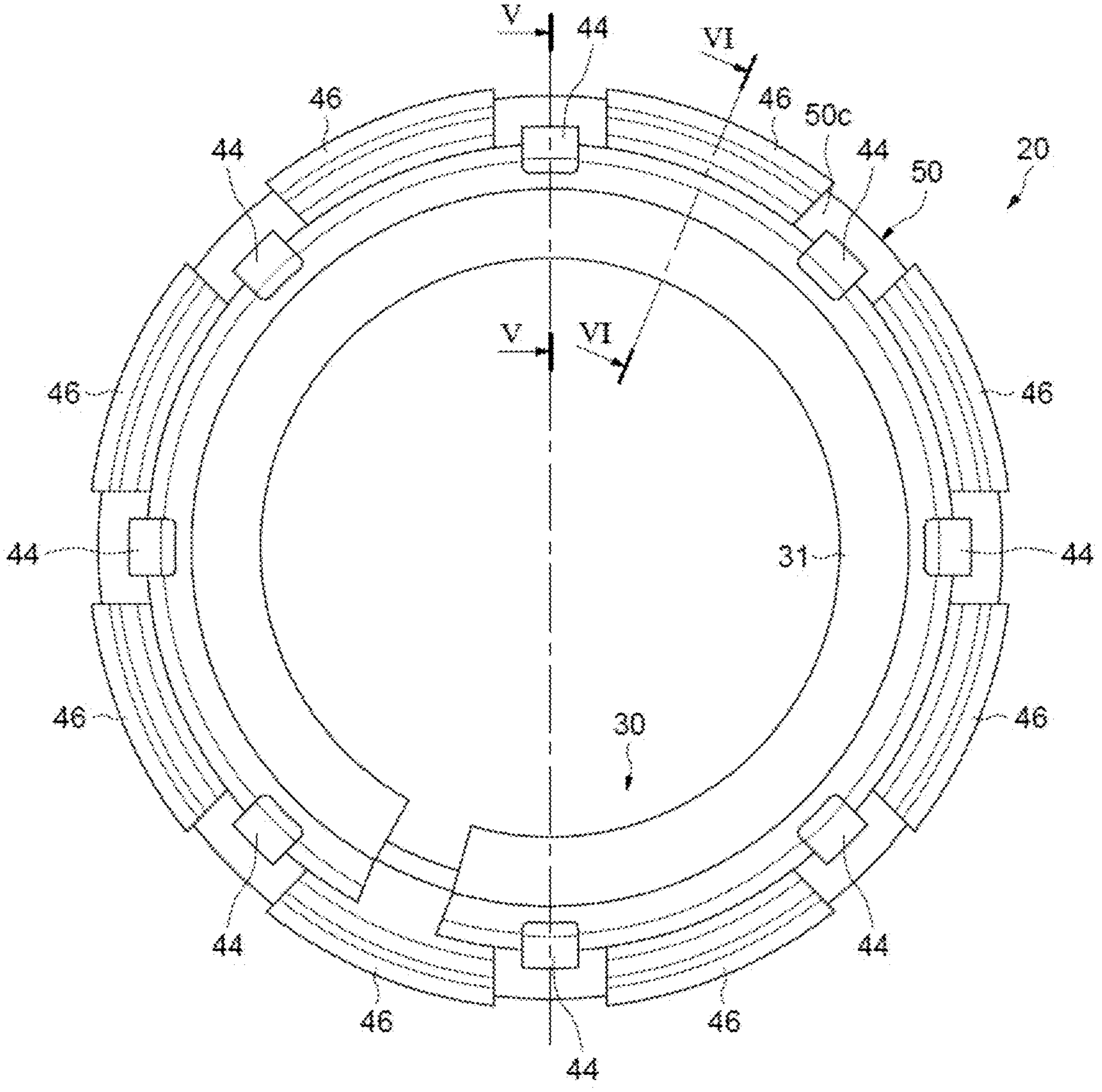
FIG. 4 is a face-on view of the grounding brush assembly of FIGS. 2 and 3.

As illustrated in FIGS. 2-4, the centering tabs 46 are spaced apart from each other in the circumferential direction, in this instance evenly or regularly. As an alternative, the tabs 46 may be irregularly circumferential spaced or staggered. Each centering tab 46 is positioned in the circumferential direction between two immediately successive retention tongues 44. Specifically, each tab 46 is spaced apart in the circumferential direction from the two immediately adjacent tongues 44. Preferably, each centering tab 46 has a circumferential dimension greater than a circumferential dimension of each one of the retention tongues 44.

With reference again to FIGS. 5 and 6, the mounting plate 40 further includes a mounting portion 52 extending axially from the radial portion 42 on the side opposite the retention tongues 44 and the centering tabs 46, i.e., from the second axial side of the radial portion 42. Preferably, the mounting portion 52 extends axially and is of annular shape. The mounting portion 52 extends from a small-diameter edge of the radial portion 42.

The mounting plate 40 is produced by cutting and pressing. The mounting plate 40 is made from a conductive material such as aluminum, stainless steel, bronze, copper or another appropriate material. Alternatively, the mounting plate 40 may be made from an electrically non-conductive material with a conductive coating or a conductive paint applied to the plate 40. Preferably, the mounting plate 40 is made as a single piece or of one-piece construction.

As discussed above, the grounding brush assembly 20 further comprises the spacer washer 50 supported by the mounting plate 40. The washer 50 is a part that is distinct from, and formed separately from, the mounting plate 40. The washer 50 is arranged axially on the side opposite the brush 30 in relation to the radial portion 42 of the mounting plate 40; in other words, the washer 50 is arranged axially on the second side of the mounting plate 40 so as to be located opposite to brush 30.

The washer 50 is mounted on the mounting portion 52 of the mounting plate. Specifically, the washer 50 is preferably centered on the mounting portion 52 and is mounted so as to be pressed axially against the radial portion 42 of the mounting plate 40 axially on the second side of the plate 40 opposite to the brush 30. As such, the brush 30 and the washer 50 are each mounted so as to be pressed axially on each side of the radial portion 42. The washer 50 partially protrudes axially towards the outside with respect to the mounting portion 52 of the mounting plate 40. In the depicted exemplary embodiment, the washer 50 is of annular shape. Alternatively, the washer 50 could be open at a point on its circumference so as to have circumferential ends.

The washer 50 comprises a cylindrical axial outer surface 50*a*, a cylindrical bore 50*b* radially opposite to the outer surface 50*a*, and two opposite, radially-extending or radial faces 50*c*, 50*d* axially delimiting the bore 50*b* and the outer surface 50*a*. The radial face 50*c* of the washer 50 is mounted pressed axially against the radial portion 42 of the mounting plate 40. The opposing radial face 50*d* is offset axially towards the outside with respect to the free end of the mounting portion 52 of the mounting plate 40. The bore 50*b* of the washer 50 is mounted so as to be pressed radially against the outer surface of the mounting portion 52 of the radial portion 42 of the mounting plate 40. Preferably, the outer surface 50*a* of the washer 50 is offset radially inwardly with respect to the free large-diameter edges of the centering tabs 46 of the plate 40.

Preferably, the washer 50 is made from a material which is electrically insulating. For example, the washer 50 may be made from a synthetic material such as plastic, in particular from PEEK, PBT, PPS, PAI.

While the electric machine 10 is in operation, any electric charge that builds up on the shaft 14 is dissipated to the housing 12 through the conductive fibers 31, the support 32 of the brush 30, and the mounting plate 40 of the grounding brush assembly 20.

Due to the washer 50, contact between the conductive fibers 31 of the brush 30 and the bearing 16 is prevented.

In the depicted exemplary embodiment, the mounting plate 40 of the grounding brush assembly 20 includes a plurality of centering tabs 46. Alternatively, the tabs 46 may be replaced by an annular flange providing an annular centering portion (not depicted).

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly comprising:

a grounding brush including a support and a plurality of conductive fibers disposed at least partially within the support;

a brush mounting plate having a radial portion with a first axial side and an opposing second axial side, the brush being secured to the first axial side of the radial portion of the mounting plate, the mounting plate including a mounting portion extending axially from a small-diameter edge of the radial portion on the second axial side of the mounting plate; and a spacer washer having an inner cylindrical bore, the bore being pressed radially against an outer surface of the mounting portion of the mounting plate such that the washer is supported by the mounting plate and arranged axially on the second axial side of the radial portion of the mounting plate so as to be located opposite to the brush.

2. The assembly according to claim 1, wherein the spacer washer protrudes axially with respect to the mounting plate.

3. The assembly according to claim 1, wherein the spacer washer is made from a material which is electrically insulating.

4. The assembly according to claim 1, wherein the spacer washer is annular.

5. The assembly according to claim 1, wherein the mounting plate includes a radial portion having opposing first and second sides, the brush pressing axially against the first side and the spacer washer pressing axially against the second side.

6. The assembly according to claim 5, wherein the mounting plate comprises at least one mounting portion extending at least axially from the radial portion, the spacer washer being mounted on the mounting portion of the mounting plate.

7. The assembly according to claim 5, wherein the mounting plate includes a plurality of retention tongues extending from the radial portion of the mounting plate, the plurality of retention tongues retaining the support of the brush.

8. The assembly according to claim 5, wherein the mounting plate includes at least one centering tab extending at least axially from the radial portion, being offset radially outwardly with respect to the support of the brush and having an outer surface defining the outside diameter of the mounting plate.

9. The assembly according to claim 8, wherein the outer surface of the spacer washer is flush with or is radially set back from the outer surface of the at least one centering tab.

10. An electric motor comprising:

a housing;

a shaft; and at least one grounding brush assembly according to claim 1 mounted radially between the housing and the shaft, the conductive fibers of the brush of the assembly being in contact with the shaft.

* * * * *